Aug. 12, 1969   E. T. ARMSTRONG   3,460,538
HYPOTHERMIA APPARATUS AND METHOD FOR TREATING THE
HUMAN BODY AND THE LIKE
Filed Oct. 20, 1967   2 Sheets-Sheet 2
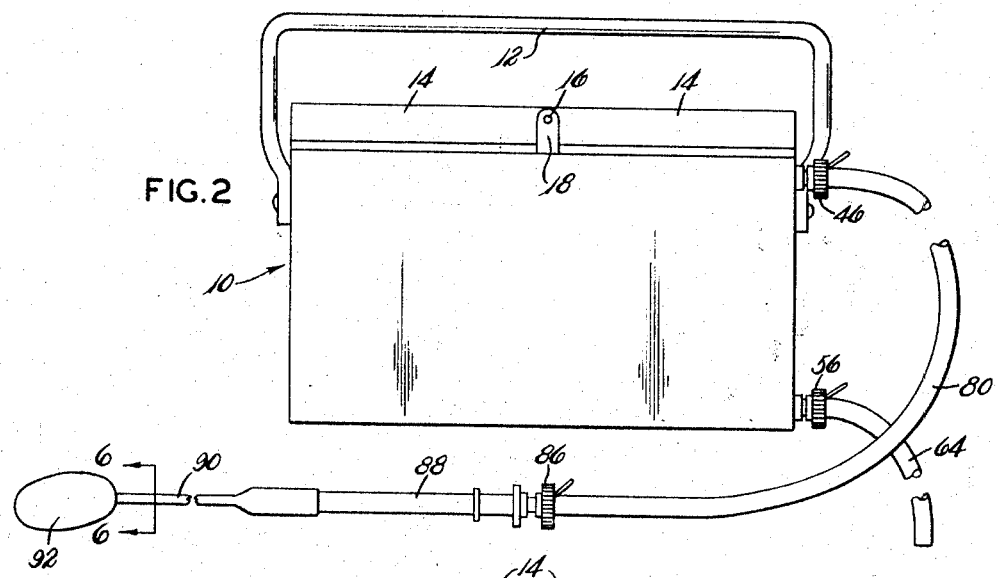
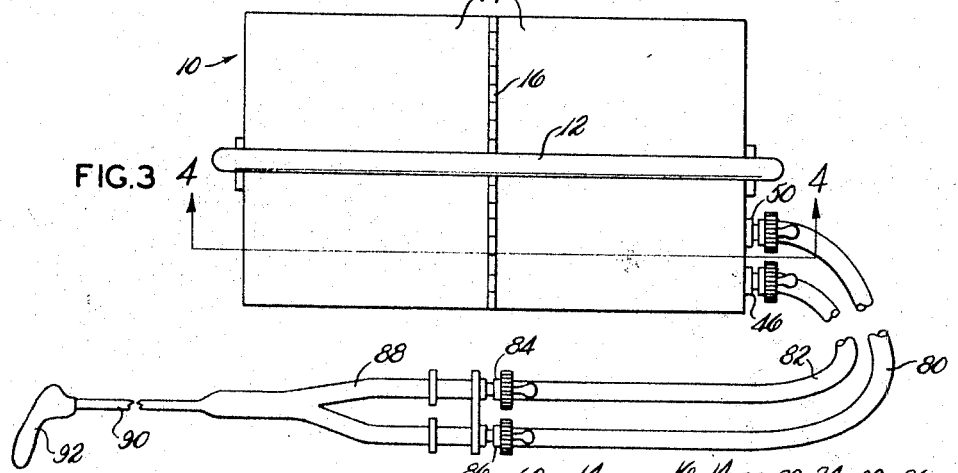
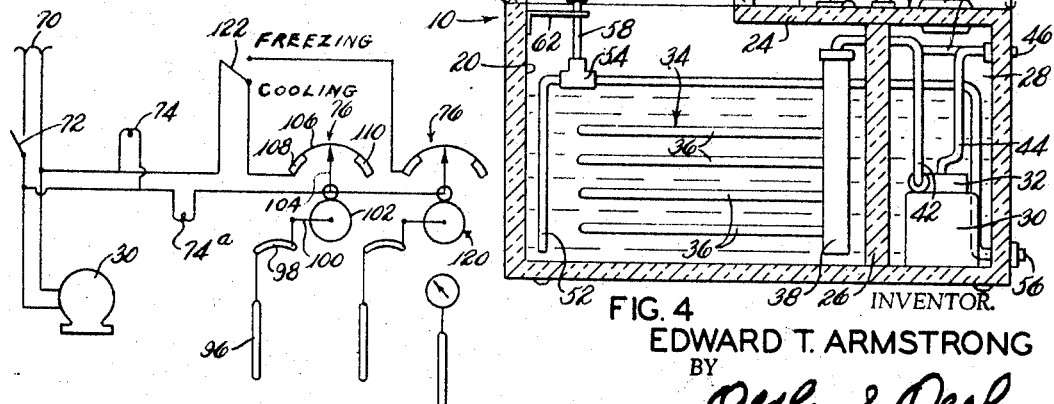
INVENTOR.
EDWARD T. ARMSTRONG
BY
Oldham & Oldham
ATTYS.

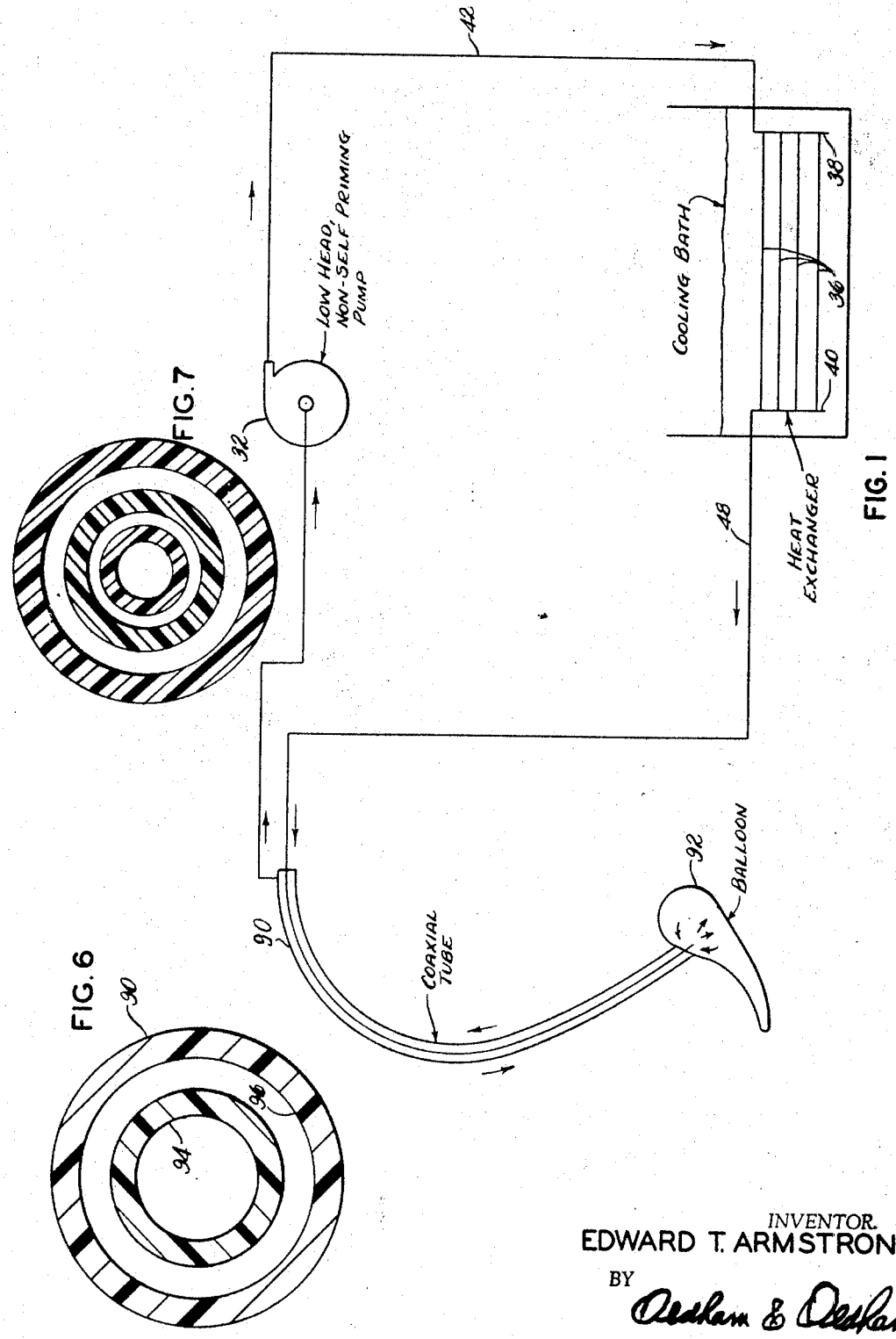

United States Patent Office 3,460,538
Patented Aug. 12, 1969

3,460,538
HYPOTHERMIA APPARATUS AND METHOD FOR TREATING THE HUMAN BODY AND THE LIKE
Edward T. Armstrong, 490 Pepperidge Tree Terrace, Smoke Rise, Butler, N.J. 07405
Continuation-in-part of application Ser. No. 313,202, Oct. 2, 1963. This application Oct. 20, 1967, Ser. No. 680,608
Int. Cl. A61b 17/36
U.S. Cl. 128—303.1    10 Claims

ABSTRACT OF THE DISCLOSURE

That method of hypothermically treating locally a condition of the human body which includes the steps of introducing a flexible bag through a body opening into an area to be treated, passing a non-toxic liquid to the bag through a small diameter lumen, said liquid comprising more than about 25% and less than about 50% of propylene glycol suitably and non-toxically corrosion inhibited, possibly including a surface tension depressant and possibly containing colorimetric or PH responsive indicators and the balance substantially water, withdrawing the liquid from the bag by a lumen surrounding the first-named lumen, the pressure drops in said lumens being substantially equal, circulating the liquid from the bag at a pressure of several inches of water through a heat exchanger positioned in a liquid bath, cooling the bath with ice, returning the cooled liquid to the first lumen, providing a warning if the temperature of the heat exchanger is above or below selected limits, and automatically stopping the circulation of the liquid in the event of air entrainment. Stated in terms of apparatus, the hypothermia apparatus includes an endless circulating system, a non-toxic liquid filling the system, a low pressure pump for circulating the liquid in the system, a flexible inflatable bag in the system, a lumen having a minimum outside diameter in the system for supplying liquid to and from the bag, a heat exchanger in the system, liquid means for cooling the heat exchanger, and means for driving the pump.

---

This invention relates to methods and apparatus for freezing or cooling portions of living organisms, such as human bodies, and more particularly for stopping bleeding in human bodies or for treating ulcers, growths, or the like with a freezing technique, and is a continuation-in-part of my abandoned application Ser. No. 313,-202 filed Oct. 2, 1963.

It is the general object of the present invention to provide relatively simple, easily operated, substantially error proof methods and apparatus for freezing or cooling portions of the human body, and the like, which apparatus is portable, and relatively inexpensive.

Another object of the invention is the provision of a non-toxic coolant comprising water and propylene glycol so that should leakage occur into the human body little or toxic effects will result.

Another object of the invention is the provision of methods and apparatus as described utilizing a double walled lumen having concentric passages providing substantially uniform pressure drops in each passage whereby the maximum of flow can be effected with the minimum outside diameter of the lumen to facilitate entry into body openings.

For a better understanding of the invention reference should be had to the accompanying drawings wherein:

FIG. 1 is a schematic illustration of the hypothermia system of the invention illustrating the manner of cooling liquid flow therein;

FIG. 2 is a side elevation of a specific apparatus built to incorporate principles of the invention;

FIG. 3 is a plan of the apparatus of FIG. 2;

FIG. 4 is a vertical longitudinal cross sectional view of the apparatus of FIG. 3 taken substantially on line 4—4 thereof;

FIG. 5 is a diagrammatic wiring diagram of the electricals of the apparatus; and FIG. 6 is an enlarged fragmentary transverse sectional view of the double lumen of the apparatus taken substantially on line 6—6 of FIG. 2; and FIG. 7 is an enlarged fragmentary transverse sectional view of a triple lumen modification that might be utilized in certain situations.

Referring to the specific embodiment of the invention illustrated in the drawings, the numeral 10 indicates generally a portable chest having a foldable handle 12 thereon for facilitating the carrying of the chest. The chest 10 is made of a suitable construction so as to have insulated walls, sides, and bottom, usually encased in sheet metal, and is adapted to be removably closed at its open top by means of a pair of lids 14 hinged at 16 to brackets 18. One lid 14 opens to a liquid receiving compartment 20, whereas the second lid 14 (see FIG. 4) is to removably enclose an instrument panel 22 mounted upon a member 24 closing the top of the rest of the chest. A skirt 26, partially separates the liquid receiving compartment 20 from a space 28 adapted to receive a motor 30 which drives a low pressure non-self priming pump 32.

Positioned in the liquid receiving compartment 20 is a heat exchanger indicated as a whole by the numeral 34 and comprising a plurality of vertically spaced U-shaped tubes 36 held in parallel position to each other and connected at their ends to vertically positioned headers 38 and 40. The header 38 in FIG. 4 stands directly in front of header 40, with header 38 being connected by conduit 42 to the discharge port of pump 32. The inlet port of pump 32 is connected by a conduit 44 with a two part quick-connect fitting 46 mounted in the end wall of the chest 10. The other header 40 is connected by conduit 48 with a two part quick-connect fitting 50 also in the end of the chest 10.

In order to maintain the level of the liquid in the compartment 20 a standpipe 52 is provided having an open lower end spaced just above the floor of the compartment 20, and with the standpipe 52 extending through a T fitting 54 through the partition 26 and out of the bottom of the end wall of the chest 10 being connected to a two part quick-connect fitting 56 at the bottom of this end wall. The T fitting 54 connects to a short vertically directed conduit 58 which has its upper end removably closed by a screw-on cap 60, the tube 58 being held in a corner bracket 62 secured inside of the compartment 20. With the screw cap 60 loosened to allow the entry of air the standpipe 52 merely serves to maintain the level of the liquid in the compartment 20 constant, with any excess liquid flowing out through quick-connect coupling 56 and a drain hose 64 (see FIG. 2). With screw cap 60 closed and the chest 10 tilted slightly to start the siphoning action the liquid in the compartment 20 is siphoned out through the drain hose 64 for example, to a storage or waste container. The drain hose 64 carrying one part of the coupling 56 may be quick disconnected from the other part of the coupling 56 carried by the chest with one or both parts of the coupling automatically closing upon being disconnected.

Mounted in the insulated member 24 is an electrical inlet socket 70, an on and off switch 72, light means 74, and temperature indicating means 76 all exposed on the right hand cover 14 of FIG. 4, and indicated in diagrammatic form in FIG. 5.

Releasably secured by the mating portions of the quick connect coupling 46 and 50 are a pair of tubes 80 and 82 which extend to two part quick disconnect couplings 84 and 86 having portions connected to the branches of a Y-shaped member 88 in turn connected to the inside and outside passages of a double walled lumen 90 connecting to a flexible bag or balloon 92 which is adapted to be collapsed to a relatively small size, usually being invaginated by and wrapped or folded around the end of the lumen 90 for insertion into a body opening.

FIG. 6 is an enlarged cross sectional view of the lumen 90 showing the double concentric walls thereof and the inside passage 94 and the surrounding passage 96. An important part of the invention concept is to keep the outside diameter of the lumen 90 to a minimum while still insuring adequate flow under low pressure to and from the bag 92 by means of the lumen, and in order to achieve the greatest flow it is necessary that the pressure drops of the inside passage 94 and the outside passage 96 be kept substantially equal, or that the sum of the pressure drops is a minimum. Conventional mathematical analysis to determine the dimensions of the lumen 90 have proved to result in errors resulting in pressure drops having differences as high as 4 to 1 between the inside passage 94 and the outside passage 96 with the resulting characteristic that the relatively low pressures utilized in the hypothermia system do not provide adequate liquid flow for the desired cooling or freezing actions.

I have found that the best manner of determining the relative size of the passages 94 and 96 in order to assure uniform or desired pressure drops therein is as follows: For equal pressure drops per unit of length, the theoretical relationships predict that the hydraulic radii of the passages 94 and 96 should be the same. This prediction is not found to be approximated experimentally. Under conditions of ideal flow when the hydraulic radius of the annulus 96 is plotted as a function of the hydraulic radius of the center tube 94, instead of having a line inclined to the axis with a slope of 45° or unity indicating that the two radii are the same, the experimental data yields a line as plotted which does not pass through the zero-zero axis and does not have a slope of unity, as defined by the equation:

Hydraulic radius of the annulus 96=0.083 times the hydraulic radius of the center tube 94 plus 0.0122, where the intercept is 0.0122 and the slope is 0.083

Thus, we see that the pertinent existing theory is inadequate, and that experimental data are required to determine the optimum hydraulic radii of the passages 94 and 96. It has clearly been established from the experimental data resulting in the above equation that changes in radii of only a few thousandths of an inch materially disturb the flow. Therefore, the width of the walls of center tube 94 is very sensitive as this will result in large variations in the hydraulic radius of the annulus 96. In some instances it may be necessary to provide more than two passages with equal pressure drops. FIG. 7 illustrates a three passage lumen. The same relationship set forth above gives the dimensional characteristics in such plural passage lumens.

Typical examples of lumen dimensions are set forth in the table below.

by this pump is only a few feet of water, much of which total is dissipated by the resistance of the coolant passages. Thus, the dangers of rupture of the balloon 92 in use is substantially avoided, as is the occurrence of leaks in the system. By making the pump 32 non-self priming, this means should any leaks develop in the system, or air get into the system the flow of the pump stops, even though it continues to rotate, and cooling liquid is not pumped into the stomach to increase its volume.

The cooling liquid passing from the pump 32 by way of conduit 42 to the header 38 then passes through the coils 36 of the heat exchanger 34 to the other header 40 and out to the inside passage of the double walled lumen 90 and hence to the balloon 92, circulates through the balloon and back out the outside passage 96 of the lumen to return to the inlet to the pump 32.

The closed hypothermia system of FIG. 1 is filled with a non-toxic cooling liquid which is used for both cooling and freezing operations. It is one of the features of the invention that this liquid comprise a mixture of up to 50% propylene glycol and the balance substantially water. Stated more specifically, the liquid in the system is water with more than about 25% propylene glycol and less than about 50% thereof. Ranges of between about 35% propylene glycol and about 45% thereof in water have been found particularly effective for gastric freezing procedures. The cooling liquid described is particularly non-toxic and even though leakage should develop into the human body the effects are not harmful. Moreover, in the concentration ranges specified and at the temperatures at which the cooling liquid is circulated, the viscosity is satisfactory for use with the relatively low pump pressures and the minimum diameter of the outside of the double lumen 90, and the coolant exhibits a suitably depressed freezing point.

In addition, the viscosity of the coolant is sufficiently high so that any jet action of the inflow of the coolant into the balloon 92 is avoided and more uniform temperature throughout the balloon 92 is achieved. The coolant of the invention has a viscosity of 0° C. of at least about 10 cps. and at −20° C. of at least about 37 cps. This is materially higher than the viscosity of ethyl alcohol or water solutions thereof. Also, the coolant of the invention has a high density gradient which in the absence of high momentum jets is able to further improve uniformity of temperautre in the balloon 92. Thus, uniformity of temperature is achieved in the balloon 92 in the manner described, and without this viscosity and density gradient dependent propensity, control of FROM patient temperatures is impossible and misleading.

The compartment 20 receives a cooling bath for cooling the heat exchanger 34 and the invention preferably employs water which is cooled with ordinary ice to provide temperatures for stopping bleeding. To provide temperatures with the apparatus for effecting freezing, for example, the freezing of a stomach ulcer to effect the cure thereof, the bath is cooled with Dry Ice, and is formulated with a selected amount of propylene glycol to provide a bath which has a freezing point within a few degrees centigrade of that of the coolant, these temperatures being set to optimize the therapeutic freezing procedure.

In a typical cooling operation with ordinary ice in the water in compartment 20 the temperature of the cooling

TABLE I.—LUMEN DIMENSIONS, INCHES

| | Length | Outer section | | Inner section | | Hydraulic radius, R [1] | |
|---|---|---|---|---|---|---|---|
| | | O.D. | I.D. | O.D. | I.D. | Annulus | Bore |
| Nasogastric | 27.5 | .250 | .205 | .147 | 1.15 | .0145 | .0287 |
| Orogastric | 26.0 | .375 | .315 | .250 | .205 | .0162 | .051 |
| Rectal | 17.0 | .250 | .205 | .147 | .115 | .0145 | .0287 |

[1] R=Area/wetted perimeter. See references on fluid friction, for example, Heat Transfer, McAdams, McGraw-Hill Book Company, New York, N.Y.

Turning now to FIG. 1, the hypothermia system of the invention is illustrated as including the low head, non-self priming pump 32, and the pressure generated bath surrounding the heat exchanger 34 is within a few degrees of 32° F. Circulation of the cooling liquid through the system and the balloon 92 results in a steady state temperature, during use, of the liquid passed to the lumen 90 of from about eight degrees to about fifteen degrees higher than the temperature of the cooling bath. There is, with a system performing satisfactorily between about a three degree to an eight degree warmup of the cooling liquid by the patient before the return thereof to the heat exchanger.

In the use of the apparatus for cooling as just described it is important that the temperature of the cooling liquid passed to the patient should never drop below 32° F., and this is ensured by the aforesaid character of the cooling bath surrounding the heat exchanger 34, namely that this bath itself can never get below 32° F., and by the fact that there is a heat loss through the heat exchanger and during the passage of the cooling liquid to the patient so that the temperatures of the cooling liquid are at the indicated levels above 32° F. when in actual contact with the patient. When temperatures of the cooling liquid returned from the patient exceed about 59° F. this is too high to effectively stop bleeding and more ice should be added to the compartment 20, the liquid level therein being maintained by the standpipe 52, as previously described.

In order to give warning of temperatures above 59° F. suitable indicating means is provided. Thus, FIG. 5 illustrates an electrical diagram including connector plug 70, on-off switch 72, motor 30, a green indicator light 74 to indicate that the apparatus has been turned on, and a red indicator light 74a to indicate an unsatisfactory temperature. The operation on-off of the light 74a is controlled by a double acting bimetallic sensor or by a pressure producing thermometer 76 adapted to arcuately swing an arcuate pressure cell 98 anchored at one end and pivotally connected at its free end to a crank 100 connecting through gearing 102 to drive a needle over an indicator scale 106 having adjustably positioned contact plates 108 and 110 at either end of the indicator scale. A bimetallic strip (not shown) could operate the light 74a at +59° F. or more and also at −12° F. or less which indicates for freezing procedures an approach to undesirably low temperatures. Failure to heed this warning allows a safety feature to come into play. This is a flow restriction by crystallization and viscosity increases in one or more banks of the heat exchanger. This increases the flow through remaining banks and reduces the cooling and temperature drop in these banks. In consequence, safe, warmer coolant temperatures are introduced to the patient balloon, and safety prevails.

By placing the thermometer 96 in the conduit 48 leaving the heat exchanger 34 the temperature of the cooling liquid passing to the patient acts to move the temperature indicating needle 104 over the temperature scale providing an indication of the TO patient coolant temperature. Similarly, the FROM patient and BATH temperatures may be monitored. If these temperatures drop too low or if the temperature goes too high appropriate action should then be taken by the operator to add more ice to the cooling bath if the temperature is too high or to properly control the freezing bath if the temperature goes too low. These temperature displays are an independent backup to the warning light 74a.

Now when the apparatus and method are employed for freezing the ordinary ice in the cooling bath of compartment 20 is replaced with Dry Ice, and the bath is preferably provided with a selected concentration of propylene glycol, as hereinafter described. The Dry Ice is at a temperature of −109° F. and when placed in the bath it has been found that it is possible to maintain a substantially constant temperature in the cooling bath of −10° F. This is achieved by the formation of a gel-like mass of soft ice around each individual piece of Dry Ice, with the very cold bubbles from the Dry Ice passing through the liquid replacing warmer $CO_2$ saturated in the bath releasing it to the surface of the bath, and with a resulting transfer through the heat exchanger 34 to the cooling liquid of a temperature between about −4° F. and +14° F. in the cooling liquid as passed to the lumen 90 and TO the patient. Freezing at a temperature below −4° F. is thus prevented and possible necrosis is avoided which could lead to serious disability in the treatment of a gastric ulcer. The temperature of the coolant passing FROM the patient in the freezing operation should be colder than about +18° F.

Returning to FIG. 5, another temperature controlled gauge and switching means indicated as a whole by the numeral 120, and previously described, can be utilized to measure the temperature of the cooling liquid passed to the lumen 90 when the apparatus and method are used for freezing, this being connected in the manner shown, and with a double throw single pole switch 122 being utilized to connect the circuitry either to the cooling or the freezing indicator. Thus, the guage and switching means 120 will act to light the red light 74a in the event that the cooling liquid passed to the patient during a freezing treatment drops to too low a temperature or rises to too high a temperature. Alternatively, the gauge and switching means may sense the heat exchanger bath temperature to actuate a warning light.

In the use of the method and apparatus of the invention, it will be understood that the closed circulating system of FIG. 1 will be appropriately bled free of air, by the use of known bleeder bottle or valve techniques. To keep the system free from air the quick-connect and quick-disconnect couplings described all include ball or conical seat valves which normally close when the two part couplings are broken so as to assist in retaining coolant within and in keeping air out of the system.

The present disclosure of the invention will not dwell at any length on particular medical freezing or hemorrhage control techniques, these being generally understood by those skilled in the art. Suffice it to say here that the bag or balloon 92 is usually collapsed and held lightly in this position about the end of the lumen 90, with the bag and lumen being inserted through a body opening, for example, through the mouth into the stomach to effect the treatment of a gastric ulcer. The temperature of the cooling bath has been previously brought within limits already specified, the circulating pump 32 is started to effect the circulation of the cooling fluid through the system and the freezing of the gastric ulcer in the patient's stomach is effected.

It is often advisable in the use of the apparatus for freezing in particular to precirculate the cooling liquid through the system so that the treatment can almost immediately begin once the bag 92 and lumen 90 are positioned as desired. This precirculating operation is facilitated by disconnecting the quick disconnect couplings 84 and 86 and connecting the coupling 86 to the coupling 46 in the end of the chest 10. Thus the cooling liquid can be circulated through the chest 10, out tube 80 and back into the chest, with tube 82 not connected. All connections for complete circulation through lumen 90 and bag 92 are remade once the patient has been intubated by passing the balloon 92 into his stomach. A nasogastric tube is also used to withdraw secretion from the stomach before and during this procedure.

It has been found that the apparatus and method operate to give a quicker freezing of a stomach ulcer than has heretofore been possible. It is also possible to give a patient a plurality of freezes and thaws in a single treatment, this apparently aiding in the cure of the ulcer. It has been found useful to use a suction tube before and during such procedures to withdraw gastric secretions from the stomach which can interfere with proper freezing action.

A feature of the invention is the adding to the cooling bath of a controlled percentage of a suitable non-toxic, bath temperature controlling agent, and particularly propylene glycol, in amounts usually more than about 25% and less than about 60%, to further assist in the gelling procedure previously described. This gellation achieves the effect that the temperature of the coolant liquid circulated to the stomach of the patient can rise under the action of body heat, as well as throughout the complete cooling liquid system regardless of further cooling by the Dry Ice in the heat exchanger. In this manner excessive cooling of gastric mucosa, which is dangerous, is avoided. A contributing factor to this action is the parallel flow system for the coolant which bypasses unduly cold passages of the heat exchanger. The increased flow in the remaining passages reduces the temperature drop in the fluid and it transverses them, preventing excessive cooling of the patient. This action is achieved by setting the flow point and freezing point of the bath within a few degrees. The coolant freezing point should be equal or lower than the bath temperature by this critical amount.

A typical formulation of the coolant and of the freezing bath to maintain a typical desired constant temperature, for example −10° F. is as shown in the table below:

TABLE II-A.—WEIGHT FORMULATIONS

| Letter symbol | Material composition | Functional Application | | | | |
|---|---|---|---|---|---|---|
| | | Coolant | | Lubricant | | |
| | | Basic | Special[1] | Basic | Concentrate | Bath |
| A | Propylene glycol, USP | .375 | .000 | .375 | .3750 | .3750 |
| B | Glyceryl mono oleate, edible [2] | .02–.05 | .050 | .02–.05 | .0500 | |
| C | Dibasic potassium phosphate, USP. | .0025 | .0025 | .0025 | .0025 | .0025 |
| D | Propylparaben, USP [3] | .001 | .001 | .001 | .001 | .001 |
| E | Identifying dye, F D and C | .0001 | .000 | .0001 | .0001 | .0001 |
| F | Water | .5714 | .9465 | .5714 | .0714 | .6214 |
| | Total | 1.0000 | 1.0000 | 1.0000 | .5000 | .9500 |

[1] After Moss, special coolant which is lubricating, corrosion and spoilage inhibited.
[2] Federal Register, GRAS, paragraph 21.01 sub port B, food additive, December 2, 1964, ALDO MOD, EDIBLE 20–780.
[3] Propyl Parasept, USP is an alternative designation.

TABLE II-B.—COMPOSITION BY FUNCTION

| Letter symbol | Function | Sources |
|---|---|---|
| A | Freezing point depressant and lubricant base. | Union Carbide. |
| B | Surface-active lubricant complementary to A. | Glycol Chemicals. |
| C | Corrosion inhibitor | Matheson Coleman and Bell. |
| D | Bacteriostatic and fungistatic inhibitor | Heyden Chemical Division. |
| E | Indicating dye, fades indicating excessive exposure in use. | Allied Chem., National Aniline Div. |
| F | Vehicle | |

In the use of the apparatus the cooling bath is normally to the desired temperature in less than five minutes, with the apparatus then being applied to the patient, and with the treated parts of the patient then coming to the desired treating temperatures within approximately five to ten minutes. The freezing procedure requires fifteen to twenty minutes precooling and reaches functional temperatures when applied to the patient in about ten minutes.

The coolant may contain about 5% radio-opaque powder when X-ray visualization is desired. Typical powder is sold under the trademark "Hypaque" by Winthrop Laboratories, 1450 Broadway, New York 18, N.Y.

While a certain representative embodiment and details have been shown for the purpose of illustrating the invention, it will be apparent to those skilled in this art that various changes and modifications may be made therein without departing from the spirit or scope of the invention.

What is claimed is:

1. That method of hypothermically treating a condition of the human body which includes the steps of introducing a flexible bag through a body opening into a region to be treated, passing a liquid coolant comprising a mixture of propylene glycol and water to the bag through a small diameter lumen, withdrawing the liquid from the bag by a second lumen, circulating the liquid through a heat exchanger positioned in a bath, cooling the bath, and returning the liquid to the first lumen, the method being characterized by the second lumen surrounding the first lumen, by substantially equal pressure drops in each lumen, and with the coolant being circulated at a pressure of only a few feet of water above atmospheric.

2. The method of claim 1 wherein the liquid coolant comprises 37.5% propylene glycol, plus 0.25% dibasic potassium phosphate, U.S.P. and less than 1% of a surface tension agent, and the balance water.

3. The method of claim 2 wherein the bath is water cooled with ice, a warning is provided if the temperature of the coolant is above or below selected limits, and the circulation of the coolant is stopped in the event of air entrainment in the coolant.

4. The method of claim 2 wherein the coolant has a viscosity at 0° C. of at least 10 cps. and at −20° C. of at least 37 cps.

5. The method of claim 2 wherein the bath includes propylene glycol to act as a freezing point depressant, and the bath is cooled by solidified carbon dioxide.

6. Hypothermia apparatus including a closed, endless circulating system, a cooling liquid in the system, and means for circulating the liquid through the system, the apparatus being characterized by the liquid being a mixture of water and propylene glycol.

7. Apparatus as called for in claim 6 including in the system a flexible inflatable bag, a concentric-walled lumen having at least an inside passage and an outside passage supplying cooling liquid to the bag by at least the inside passage and removing it from the bag by at least the outside passage, the pressure drop in all passages being substantially equal.

8. The apparatus of claim 7 wherein the hydraulic radius of each concentric outside passage is 0.083 times the hydraulic radius of the inside passage plus 0.0122.

9. The apparatus of claim 6 including quick disconnect means to allow substitution of a different bag and lumen and to provide for circulation of the liquid through the system without any bag connected.

10. The apparatus of claim 6 which includes a heat exchanger positioned in a water bath cooled with ice, and the water contains propylene glycol, and the cooling liquid passes through the heat exchanger.

References Cited

UNITED STATES PATENTS

| | | | |
|---|---|---|---|
| 3,007,473 | 11/1961 | Jackson et al. | 128—400 |
| 3,125,096 | 3/1964 | Antiles et al. | 128—401 |
| 3,254,652 | 6/1966 | Smith et al. | 128—401 |

OTHER REFERENCES

Wangensteen: JAMA, May 12, 1962, pp. 439–444.
Girardet: Surgery, December, 1964, pp. 1091–1098.

L.W. TRAPP, Primary Examiner

U.S. Cl. X.R.

128—401